(12) United States Patent
Hoffman

(10) Patent No.: US 12,152,377 B1
(45) Date of Patent: Nov. 26, 2024

(54) FAUCET HAND STERILIZER

(71) Applicant: The Hoffman Group, Portland, OR (US)

(72) Inventor: Andrew Hoffman, Portland, OR (US)

(*) Notice: Subject to any disclaimer, the term of this patent is extended or adjusted under 35 U.S.C. 154(b) by 0 days.

(21) Appl. No.: 18/363,694

(22) Filed: Aug. 1, 2023

(51) Int. Cl.
    *E03C 1/04*     (2006.01)
    *E03C 1/046*     (2006.01)
    *F03B 3/04*     (2006.01)
    *H02K 7/18*     (2006.01)

(52) U.S. Cl.
    CPC ............... *E03C 1/04* (2013.01); *E03C 1/046* (2013.01); *F03B 3/04* (2013.01); *H02K 7/1823* (2013.01); *E03C 2201/40* (2013.01)

(58) Field of Classification Search
    CPC ........ E03C 1/04; E03C 1/046; E03C 2201/40; F03B 3/04; H02K 7/1823
    USPC ........................................................ 137/801
    See application file for complete search history.

(56) References Cited

U.S. PATENT DOCUMENTS

| | | | | |
|---|---|---|---|---|
| 4,520,516 A * | 6/1985 | Parsons | .................... | E03C 1/057 367/96 |
| 6,798,080 B1 * | 9/2004 | Baarman | ................. | F03B 13/00 415/905 |
| 6,885,114 B2 * | 4/2005 | Baarman | .................... | E03C 1/08 290/43 |
| 7,121,495 B2 * | 10/2006 | Caamano | ........... | B65H 75/4486 137/355.2 |
| 7,675,188 B2 * | 3/2010 | Baarman | .................... | F03B 1/00 290/43 |
| 2009/0188995 A1 * | 7/2009 | Onodera | ................. | E03C 1/057 239/383 |

* cited by examiner

*Primary Examiner* — John Bastianelli
(74) *Attorney, Agent, or Firm* — Mark S Hubert

(57) ABSTRACT

A screw on accessory for a water faucet, that uses a light timed for the recommended period to properly sanitize/sterilize one's hands. The light may be a conventional led and may change colors at the end of the timed period, or it may use a UV light that just toggles on and off to further sterilize the water and hands. It is intended for use in areas where sterilization of one's hands is critical, such as restaurants, food preparation/packaging facilities, hospitals, day care facilities, schools, and the like. The visual notification for the length of the cleansing period also serves to reinforce to children and adults how long they must properly wash their hands to ensure sanitization. The light is powered by a mini water powered electrical turbine that is incorporated into the housing of the accessory.

7 Claims, 3 Drawing Sheets

FAUCET HAND STERILIZER

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to personal hygiene, and more particularly to hand sanitization technology.

BACKGROUND

Sterilization of one's hands is a necessity for many professions, technical procedures, food handlers, electromechanical assembly techniques and just plain human hygiene. One of the main three ways the Center for Disease Control (CDC) recommended for reducing the transmission of the COVID virus, was proper washing of the hands.

While the CDC recommends at least 20 seconds of scrubbing after the application of soap before rinsing, many people are not aware of this time frame or if they are, don't always abide by it. As with many skipped actions of humans, especially children's personal hygiene techniques, reminders work. In addition to or when hand washing is not convenient, the CDC also recommends other methods of sanitization, such as liquid sanitizers.

Henceforth, a more controllable and consistent method of cleansing hands that leads to a higher degree of sterilization would fulfill a long felt need in control of disease. This new invention utilizes and combines known and new technologies in a unique and novel configuration to overcome the aforementioned problems and accomplish this.

BRIEF SUMMARY

In accordance with various embodiments, a faucet hand sterilizer is provided.

In one aspect, a device to give a visual indication of the prescribed time required for properly washing hands.

In another aspect, a device to add UV light sterilization to the act of washing hand, to sterilize the water and the hands.

In yet another aspect, a training aid for proper hand washing techniques.

In yet another aspect, a hand washing sterilizing device that may be retrofit onto any existing water faucet.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figure 1:
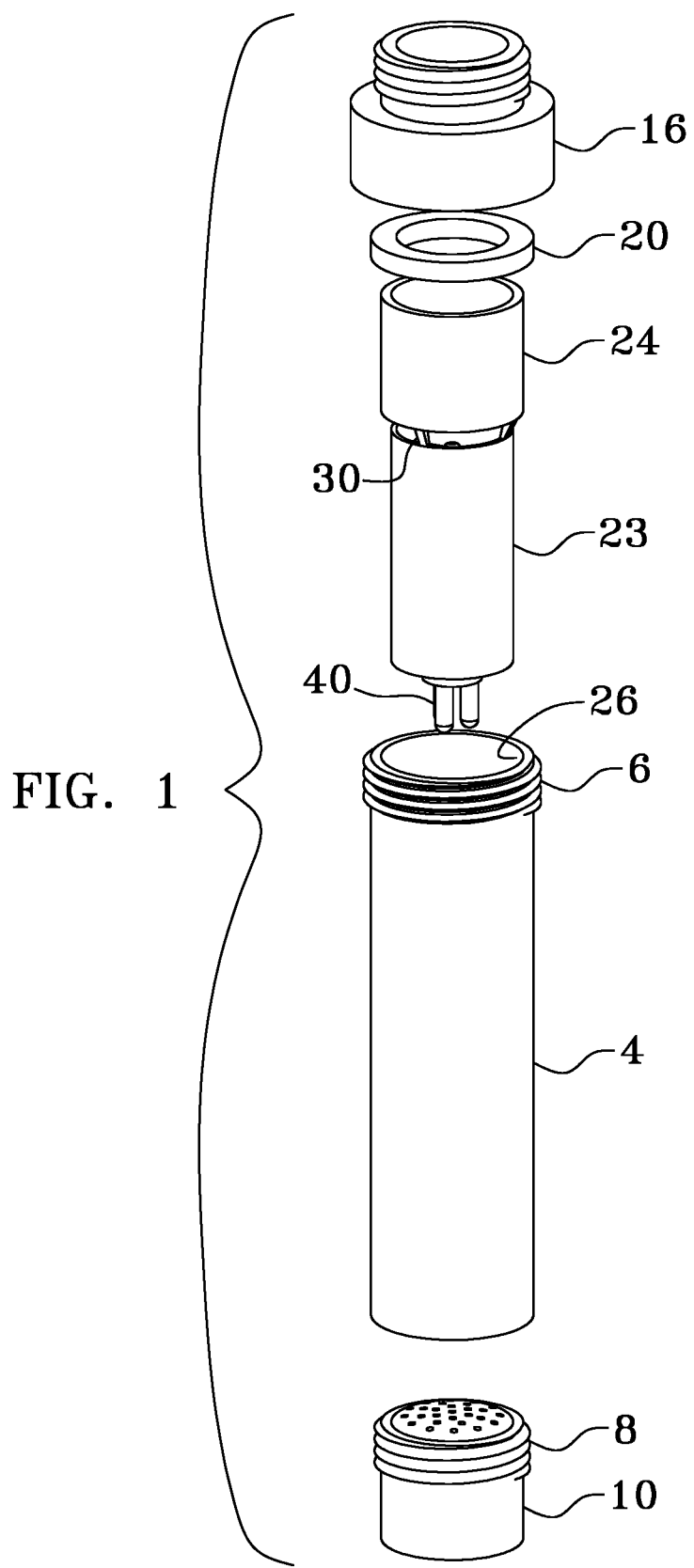
FIG. 1 is an exploded view of a faucet hand sanitizer.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the following description, for the purposes of explanation, numerous specific details are set forth in order to provide a thorough understanding of the described embodiments. It will be apparent to one skilled in the art, however, that other embodiments of the present invention may be practiced without some of these specific details. It should be appreciated that the features described with respect to one embodiment may be incorporated with other embodiments as well. By the same token, however, no single feature or features of any described embodiment should be considered essential to every embodiment of the invention, as other embodiments of the invention may omit such features.

As used herein, the term "micro hydroelectric generator unit" refers to a small inline water powered turbine that generates the power to operate the LED module with its LED lights and microprocessor.

As used herein the term "LED module" refers to a sealed DC powered LED light unit that operates LED lights (UV or visible spectrum) through its microprocessor for time periods proscribed by the microprocessor.

The present invention relates to a novel design for a hand sterilizer that is adapted to be retrofit onto the outlet of existing water faucets after the removal of the faucet's end aerator. It generates its own power that operates a microprocessor that has a timing circuit to operate UV lights for a prescribed time and/or operate a colored visual signal when the prescribed time has elapsed. Its timing circuit may be adapted for washing of human hands or for washing cycles of materials, however herein the primary purpose is to solve the problem of unclean hands after insufficient washing.

Figure 2:
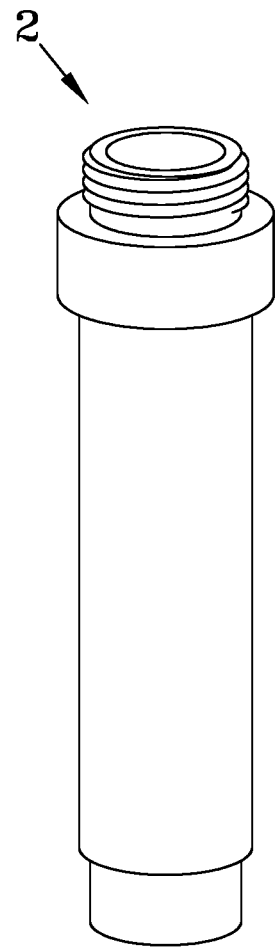
FIG. 2 is a front perspective view of an assembled faucet hand sanitizer.

Looking at FIGS. 1 and 2, it can be seen that the faucet hand sterilizer 2 has a main housing 4 (configured as a circular right cylinder) with an external top thread 6 formed on the top end and a bottom internal thread 12 on its bottom end sized to receive the aerator's external thread 8 which is formed on the top end of the aerator 10. In the preferred embodiment the top thread is an external thread and the bottom thread 8 is an internal thread, although in other embodiments the threads may be situated thereon or therein the main housing 4 of the sterilizer 2, as necessary to connect to the faucet and to attach an optional aerator 8.

The top end of the main housing 4 threadingly engages the bottom threaded end 14 of a faucet adapter 16. Inside the faucet adapter 16 there is a shoulder 18 that a seal ring 20 at the top of the positioning sleeve 23 resides and is compressed to form a watertight seal when the positioning sleeve 23 is constrained within the main housing 4. The seal ring 20 may be affixed to the top end of the positioning sleeve so as to hold the light module in suspension within the main housing 4. In an alternative assembly, the seal ring 20 may be a separate component, and the positioning sleeve's circular outer wall 24 has a diameter sized for frictional engagement with the main housing's inner wall 26. The micro hydroelectric generator unit 32 and the light module 22 are held in a centrally spaced configuration within the positioning sleeve 23 and the main housing 4.

Figure 3:
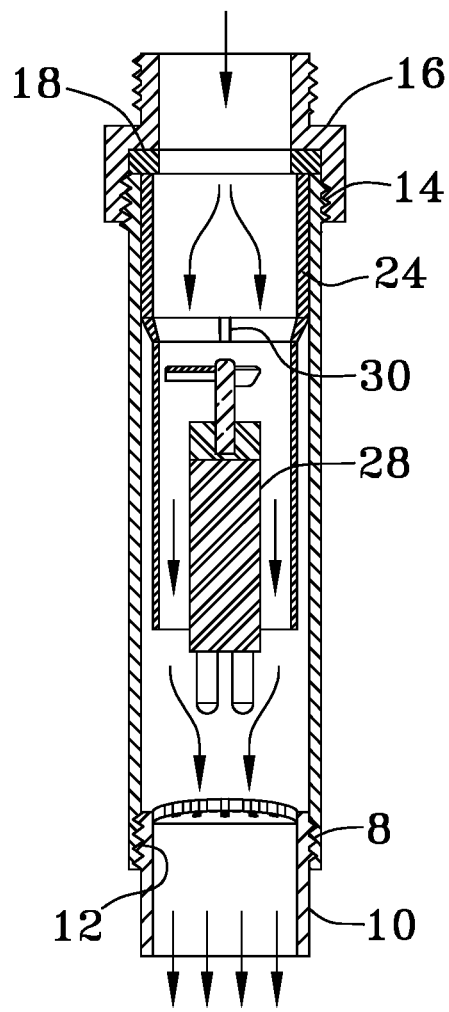
FIG. 3 is a side cross sectional of the internal support with the micro hydroelectric generator unit and the LED module.
Figure 4:
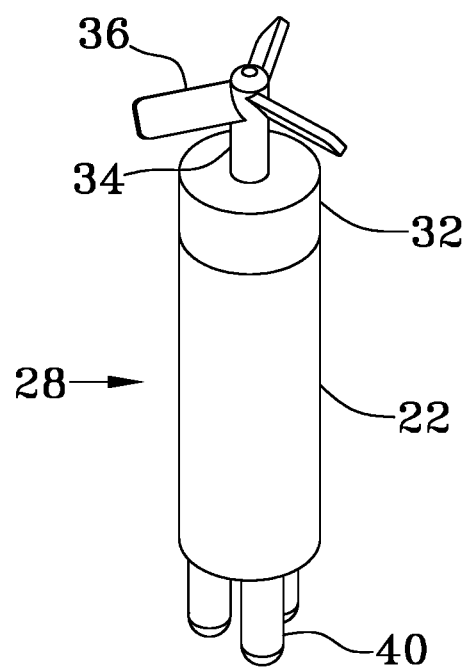
FIG. 4 is a side perspective of the hydroelectric generator and LED module.

Looking at FIGS. 3 and 4, it can be seen that inside the main housing 4 is a positioning sleeve 23 which contains a sealed waterproof cylindrical inner enclosure 28 that contains the micro hydroelectric generator unit 32 which is electriclly coupled to a light module 22. This positioning sleeve 23 has a larger diameter stabilizer ring 24 at its top end that is affixed to the remainder of the positioning sleeve 23 by a series of standoff legs 30. This stabilizes and centers the working components in the main housing 4 and also allows water to flow around the vanes 36 of the generator 32 and along the outside of the positioning sleeve to maintain an adequate flow of water through the faucet. The directional arrows of FIG. 3 illustrate the path of water.

Inside the sealed inner enclosure 28 is a micro hydroelectric generator unit 32 and a light module 18. Extending centrally through the top of the sealed inner enclosure 28 is the rotatable generator shaft 34 with a series of angled radial vanes 36 extending outwards. The generator shaft 34 passes into the top of the sealed enclosure and operationally transfers the rotation of the generator shaft 34 to a circular magnet disk affixed thereon said generator shaft that rotatingly encircles a stator with its radial series of windings. (Not illustrated but well known in the field.) The AC output of the stator passes via three wires to a circuit board with a DC generator unit voltage regulator system that converts the AC to DC and smooths out the DC voltage output. It then transfers the DC voltage to the light module with two wires.

Water passing down the faucet enters the stabilizer ring 24, passes between the standoff legs 30 and contacts the angled radial vanes 36 so as to spin the generator shaft 34 of the generator unit 34. Some of the water runs alongside the sealed enclosure. When the water reaches the bottom end of the main housing 4 it hits the aerator 10 which develops a slight backpressure so the water fills the void the lights 40 sit in between the sealed enclosure 28 and the end of the sterilizer 2. When this void is filled the sanitized water flows from the bottom of the sterilizer 2.

The DC output from the circuit board is provided via two wires to the microprocessor of the light module 22. This microprocessor has a timing circuit that powers the waterproof lights for a preset period of time upon the presentation of DC power. Some of the lights illuminate in UV and some may illuminate in the visible spectrum. There are different modes of operation that the microprocessor may operate under. In the first mode, the UV LEDs will illuminate for the preset time period then shut off until the faucet is tuned off and back on again (generally in the range of 15 to 30 seconds, preferably 20 sec). In the second mode, the microprocessor also turns on a colored LED when the UV LEDs go off. In the third mode, the microprocessor turns on a colored LED when the faucet starts and turns it off when the time has elapsed. In the fourth mode the microprocessor turns on a colored LED when the time has lapsed. There are other modes envisioned that differ in the colors presented by the LEDS during the timed period and at the end of the timed period. The UV LED light serves to sterilize the water and if there is no optional aerator installed, to also sterilize the hands. The colored lights serve to indicate the period of time the scrubbing of hands must exist for to satisfy the regulatory hand washing suggestions.

A faucet thread adaptor 16 is a solid piece that has an external thread on its faucet end that threadingly engages the thread form inside the tip of a faucet spout. Its body is a stepped cylinder with the larger diameter lower portion having an internal thread connectable to the top end of the sterilizer's main housing 2. A seal ring 20 sits in a landing within the lower portion and is compressed between the main housing and the faucet adapter make a water tight seal between the faucet spout and the sterilizer 2.

Figure 5:
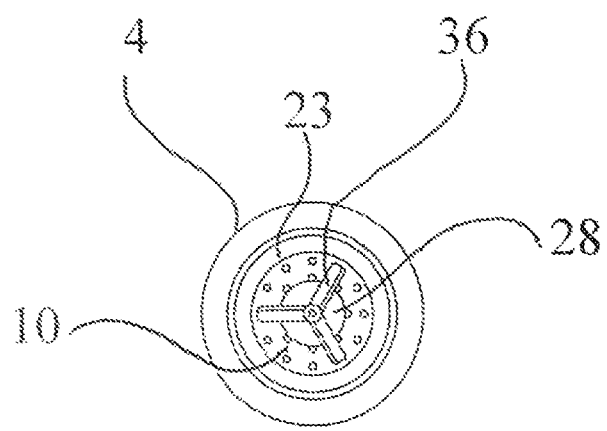
FIG. 5 is a top view of the faucet hand sanitizer.

Looking at FIGS. 3 and 5, it can be seen that in operation, the aerator from the distal end of the faucet is screwed off and the top end of the hand sterilizer 2 is threaded on in place of the aerator. The aerator is then attached to the bottom end of the main housing 4. When the faucet is opened, water flows downward past the thread adaptor 16, washer 6 and into the positioning sleeve 23 where it rushes past the angled vanes 26, spinning the generator shaft 34 and a connected magnet disk around the generator's windings within a sealed waterproof enclosure. The three phase AC electricity generated at the windings of the stator flows through three wires to the generator circuit board. The generator circuit board has sets of diodes that convert the AC power to DC power and pass it in a positive and negative wire to the voltage regulator that then passes it through a capacitor to smooth out the DC voltage which it provides to the microprocessor of the LED module. The microprocessor initiates the timer circuit and turns on the ultra violet LEDS (UV LEDS) which partially reside outside the sealed hydroelectric generator unit enclosure, and in the stream of water flowing through the faucet. These UV LEDS remain on for the period of time prescribed by the microprocessor timer. The UV LEDS help sanitize the water flowing by and if there is no barrier to light transmission (such as an aerator) also sanitize the hands. Optionally, there may be an additional color changing LED that indicates a bright visible color such as blue when the timer begins and red when the timer ends. The initiation of the red LED and/or the stoppage of the UV LEDS indicates that the hands have been washed to the degree of sanitization prescribed by the CDC or other regulatory guidelines the microprocessor is timed to correspond to.

While certain features and aspects have been described with respect to exemplary embodiments, one skilled in the art will recognize that numerous modifications are possible. System components described according to a particular structural architecture and/or with respect to one system may be organized in alternative structural architectures and/or incorporated within other described systems. Hence, while various embodiments are described with—or without-certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

Embodiments are described herein, and illustrated in the drawings, in terms of functional blocks, units and/or modules. Those skilled in the art will appreciate that these blocks, units and/or modules such as the micro hydroelectric generator unit and the light module, can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the units and/or modules being implemented by microprocessors or similar, they may be programmed using software (e.g., microcode) to perform various functions discussed herein and may optionally be driven by firmware and/or software. Alternatively, each unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Embodiments of the inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated Embodiments of the invention may include a non-transitory machine-readable medium comprising instructions executable by one or more microprocessors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A self-powered hand sterilizer adapted for connection to a water faucet, comprising:
    a main housing having an upper end and a lower end;
    a faucet adapter threadingly engaged between and outlet end of said faucet, and said upper end of main housing;
    a positioning sleeve engaged within said upper end of said main housing;
    a micro hydroelectric generator unit
    a light module comprising at least one sanitizing light and a microprocessor with a timing circuit that turns on and off said at least one sanitizing light to sanitize the water and/or the user of the faucet, and, said light module located within said positioning sleeve and electrically connected to said micro hydroelectric generator and
    a sealed waterproof cylindrical inner enclosure centrally spaced and constrained within said positioning sleeve and housing said micro hydroelectric generator and said light module.

2. The self-powered hand sterilizer of claim 1 wherein said at least one light extends beyond a bottom of said sealed waterproof cylindrical inner enclosure.

3. The self-powered hand sterilizer of claim 2 wherein said micro hydroelectric generator unit has a generator shaft with blades extending radially from a first end and a second end, said generator shaft extending through a top of said waterproof cylindrical inner enclosure and into water flowing through the faucet.

4. The self-powered hand sterilizer of claim 1, wherein said at least one sanitizing light is a UV LED light.

5. The self-powered hand sterilizer of claim 1 wherein said at least one sanitizing light is a visible spectrum LED light.

6. The self-powered hand sterilizer of claim 1 further comprising:
    a seal ring residing between said faucet adapter and said positioning sleeve.

7. The self-powered hand sterilizer of claim 1, further comprising:
   an aerator, threadingly engaged on a bottom end of said main housing.

* * * * *